(12) United States Patent
Kraus

(10) Patent No.: US 8,740,612 B2
(45) Date of Patent: Jun. 3, 2014

(54) REGENERATIVE FIRING SYSTEM

(76) Inventor: Bryan Joseph Kraus, McMurray, PA (US)

( * ) Notice: Subject to any disclaimer, the term of this patent is extended or adjusted under 35 U.S.C. 154(b) by 696 days.

(21) Appl. No.: 12/827,102

(22) Filed: Jun. 30, 2010

(65) Prior Publication Data

US 2012/0000454 A1 Jan. 5, 2012

(51) Int. Cl.
*F27D 17/00* (2006.01)

(52) U.S. Cl.
USPC ............ 432/28; 432/179; 432/180; 432/181

(58) Field of Classification Search
CPC ..................... F27D 2017/00; F27D 2017/007
USPC ........... 216/96 A; 432/179–182, 28; 431/155, 431/116, 41, 161, 210
See application file for complete search history.

(56) References Cited

U.S. PATENT DOCUMENTS

| | | | |
|---|---|---|---|
| 3,284,070 A | 11/1966 | Nishida et al. | |
| 4,196,776 A | 4/1980 | Fallon, Jr. et al. | |
| 4,202,735 A | 5/1980 | Durselen et al. | |
| 4,344,861 A | 8/1982 | Levy | |
| 4,671,346 A * | 6/1987 | Masters et al. | 165/9.3 |
| 5,154,599 A * | 10/1992 | Wunning | 431/215 |
| 5,515,909 A | 5/1996 | Tanaka | |
| 5,957,684 A * | 9/1999 | Nakagawa | 432/181 |
| 5,983,986 A | 11/1999 | Macintyre et al. | |
| 5,993,203 A | 11/1999 | Koppang | |
| 6,036,486 A * | 3/2000 | Argent et al. | 432/180 |
| 6,234,789 B1 * | 5/2001 | Miyata | 432/180 |
| 6,495,092 B1 * | 12/2002 | Hazama et al. | 266/156 |

* cited by examiner

*Primary Examiner* — Steven B McAllister
*Assistant Examiner* — Ko-Wei Lin
(74) *Attorney, Agent, or Firm* — Neal P Pierotti; Metz Lewis Brodman Must O'Keefe

(57) ABSTRACT

A regenerative firing system is disclosed which functions in a heat treating furnace or other high temperature technology. The system comprises a plurality of regenerator heat transfer boxes which absorb the heat contained in high temperature exhaust from the furnace. Each regenerator box transfers this absorbed heat to a flow of ambient air. The now heated air flows from the regenerator box into a common air stream which is then fed to a plurality of burners. The preheated air stream is supplied to a common air stream that is then simultaneously provided to each of a plurality of burners. In addition, the current invention comprises a method of heat recovery for a furnace utilizing the inventive system.

16 Claims, 7 Drawing Sheets

REGENERATIVE FIRING SYSTEM

BACKGROUND OF THE INVENTION

1. Field of the Invention

The invention relates to a regenerative furnace firing system. More particularly, the invention relates to a regenerative heat transfer system for use in heat treating furnaces and reheating furnaces.

2. Description of the Prior Art

Reheating, forging and Heat treating furnaces are utilized to alter the physical, and sometimes chemical properties of a material. The most common application of such furnaces are metallurgical, although heat treatment is often used with other materials such as glass. These furnaces are employed to heat and chill materials, notably steel, often to extreme temperatures, to achieve a desired result such as hardening or softening of the material. Heating methods include softening for forging or rolling, annealing, case hardening, precipitation strengthening, tempering and quenching.

Because reheating and heat treating furnaces operate at a variety of high temperatures, often in excess of 2000° F., they require an increased amount of energy for their operation. Large quantities of hot flue gasses are produced by heating furnaces. The recovery of some of this heat and its reuse in the heating process results in the reduction of the amount of primary fuel needed to run the system, and therefore increases efficiency. An example of such waste heat recovery is the preheating of the combustion air used to fire the burners.

Typically, waste heat recovery from large furnaces utilizes some type of heat exchanger. A heat exchanger is a device built for the efficient transfer of heat from one medium to a second medium. The media may be separated or may mix with other components of the devoce during the heat exchange process. Heat exchangers are commonly used in heating and refrigeration systems, power plants or chemical plants. A heat exchanger may be utilized to retain the waste heat produced by a heating furnace so that it may be reused to reduce fuel costs.

Gas fired fuel furnaces traditionally employ two types of heat recovery systems. Recuperators generally utilize a metallic heat exchanger and have the ability to preheat combustion air to about 800° F.-1000° F. The preheated air and fuel mixture is continuously adjusted as the furnace heats and cools to allow for the proper air/gas combustion ratio. This ratio is constantly monitored and changed as a result of volume expansion and contraction. Adjustment of the preheated air temperature is mainly controlled by the injection of dilution air into the combustion mix. As a result, recuperator systems work well with furnaces that run at a steady state temperature, for example reheating furnaces, forging temperature furnaces and other types, which operate at higher temperatures for extended periods of time. Recuperators are generally not economically practical with heat treating furnaces that require numerous temperature changes, i.e., temperature ramping and cooling cycles.

Regenerator heat recovery systems are more fuel efficient than recuperators and have the ability to operate with higher temperature furnaces, for example 2000° F. or higher. The airflow through a regenerative heat exchanger is cyclical and periodically changes. Hot exhaust air is directed from the furnace through the regenerator where it heats up a stationary medium. This medium may comprise a metallic or ceramic material. The incoming flow of hot waste air stops and cooler combustion air is then passed over the heated medium, which heats the air before it mixes with combustion gas and is directed to the burners. Current heat treatment technology requires that each furnace burner be connected to a single paired regenerator or regenerates within the burner itself during operation. In the case of single paired regenerators, each burner ceases firing at the time when the flow of preheated combustion air stops and the regenerator receives hot waste air from the furnace. Each regenerator therefore does not supply a continuous supply of preheated combustion air to its dedicated single burner. Other types of regenerative (burner) firing systems simultaneously fire and exhaust through the burner itself. However, these systems are many times not economically practical due the expense of each individual burner and the size of the furnace. Using this cyclic firing of the burners for heat treating often causes non-uniform heating of the furnace and too large of a firing footprint to meet uniformity requirements, an undesirable condition for the heat treatment of metals and other materials. The currently developed regenerators are expensive to install because of the need for a regenerator for each pair of burners and the typical space limitations due to the physical size of such regenerators. The temperature uniformity requirements of treating systems are easier to achieve with a greater number of small burners. The use of multiple burners/regenerator pairs also raises the capital investment costs due to the increased hardware cost per unit. As a result, it is generally cost prohibitive to utilize regenerators with heat treating furnaces because of the need for a large number of smaller burners.

There remains a need, therefore, in the art of heat treating, forging and reheating furnaces for a heat recovery system that utilizes burners and regenerators that do not require firing in pairs and therefore have the ability to utilize a number of small burners that achieve heating uniformity and fuel savings. Specifically, there is a need for a system that uses regenerator heat transfer boxes that are not dedicated to a single burner. Such a system allows for the continuous firing of all burners or the flexibility to pulse burners in various configurations that are not dedicated to a specific hardware arrangement, thus providing greater fuel efficiency and more precise temperature control.

SUMMARY OF THE INVENTION

The present invention discloses a system that utilizes regenerative firing technology employing various numbers of burners that operate independently of two or more regenerators. The system is useful in the operation of heating furnaces or other high temperature technologies. The inventive system utilizes various numbers of burners that receive a continuous supply of preheated combustion air and therefore can constantly fire or perform variable pulse heating independent of the regenerators, allowing for more uniform heating of the furnace. The steady supply of combustion air provides precise temperature control and is thus adaptable for use in applications that require multiple or rapid temperature changes. The use of a small number of regenerators results in lowered fuel requirements, thus reducing fuel costs.

The system comprises a plurality of regenerator heat transfer boxes that absorb the heat contained in high temperature exhaust from the furnace. Each regenerator box transfers this absorbed heat to a flow of ambient air. A media, for example aluminum spheres, accomplishes the absorption and transfer of heat from the furnace air to the ambient air. The now heated air flows from the regenerator box into a common air stream, which then feeds to a plurality of burners. Therefore, the preheated air stream produced by each of the regenerators of the present system is not dedicated to a single furnace burner. Instead, the preheated air stream is supplied to a common air stream that is then simultaneously fed to each of a plurality of burners, for instance two or more burners. As a result, it is unnecessary for the individual burners to stop firing when a regenerator box is receiving high temperature exhaust from the furnace. The use of multiple numbers of small burners provides greater control over furnace heat uniformity. In addition, the use of a limited number of regenerator boxes decreases the amount of fuel required, thus reducing operational costs.

Because each burner operates independently from a single paired regenerator, it is unnecessary for the regenerators to be placed in direct proximity to a single burner. This allows for the placement of each regenerator in any convenient location around the furnace and the ability to place additional regenerators to a preexisting system. The regenerative system also does not require the addition of burners. Rather, the decoupling of the regenerators to their respective paired burners is accomplished through the addition of pipes or lines. The system is therefore easily adapted to current heating furnaces.

In an additional aspect, the current invention comprises a method of heat recovery for a furnace. The method comprises a cycle of transferring furnace exhaust heat to an ambient air supply, providing the now heated air supply to common combustion air supply to the burners, and then again transferring additional waste furnace exhaust heat to the ambient air supply. In the first step of the cycle, a flow of heated furnace air is directed from a furnace through a valve to a regenerator for a specified period of time. The heated furnace exhaust is directed through a media, for example, tabular alumina spheres, located within the regenerator. This media has the capability to absorb and transfer the waste heat. The temperature within the regenerator is controlled with a thermocouple which provides a feedback control mechanism. When the temperature of the regenerator reaches a predetermined set point, the valve closes and the flow of heated exhaust air into the regenerator stops. Next, a second valve opens, allowing a stream of cold ambient air to enter the regenerator box and contact the heated media. The absorbed heat contained in the media is transferred from the media to the stream of ambient air. The flow of ambient air is halted at the end of a complete cycle by closing an additional valve. The now heated air is directed, through a series of valves, from the regenerator to a common combustion air supply. The common combustion air supply then flows to a plurality of burners. The cycle then begins again with the flow of waste furnace heat into the regenerator. This cycle of transferring waste furnace heat to a common combustion air supply continues until the plurality of burners reach a maximum allowable temperature. Like the regenerators, the temperature of the burner combustion air is controlled through the use of a thermocouple which provides a feedback control mechanism.

The heated air produced from each regenerator flows to each of the burners through the common combustion air supply. The preheated air stream produced by the regenerators of the present method is not dedicated to a single furnace burner. Instead, the preheated air stream is supplied to a common combustion air stream that is then provided simultaneously to each burner. Each regenerator performs a different step of the method at any given time, thus providing a constant supply of combustion air which is directed to each burner. As a result, it is unnecessary for the individual burners to stop firing when a regenerator box is receiving high temperature exhaust from the furnace. Thus, each of the burners may continuously fire or pulse in random cycles not dictated by the regenerator boxes. The use of a number of small firing burners provides greater control over furnace heat uniformity. In addition, the use of a limited number of regenerator boxes decreases the amount of fuel required, thus reducing operational costs. The duration of the flow of heated furnace exhaust into the media within the regenerator box may be shortened or eliminated in order to control the temperature of the common air supply reaching the burners.

The inventive method allows for a number of burners to receive a continuous supply of preheated combustion air and therefore constantly fire or pulse in random cycles, allowing for more uniform heating of the furnace. The steady supply of combustion air provides more precise temperature control and is thus adaptable for use in applications that require multiple or rapid temperature changes. By using a limited number of regenerator boxes results in lowered fuel requirements, thus reducing fuel costs.

DESCRIPTION OF THE PREFERRED EMBODIMENTS

Figure 1:
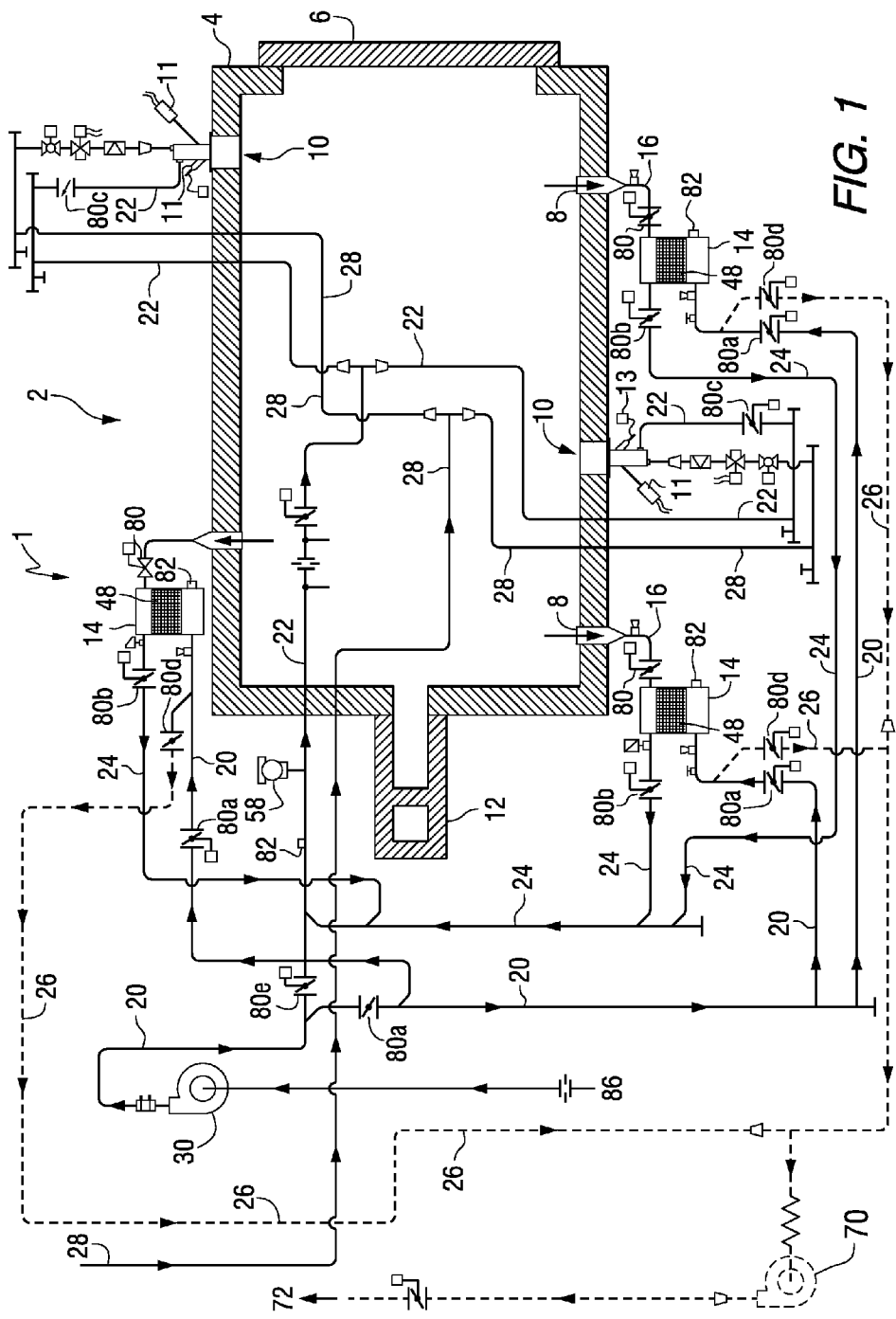
FIG. 1 is a schematic view of the regenerative firing system in accordance with the present invention.

FIG. 1 illustrates the regenerative firing system 1 of the invention for a high temperature furnace having gas fueled burners. A heat treating furnace 2 is illustrated having a number of component parts. Furnace 2 is provided with four walls 4 which are constructed from a material, such as metal or concrete, capable of withstanding the elevated temperatures necessary for the heat treating process. For example, walls 4 may be constructed from ceramic fiber or a hard refractory material. Walls 4 may be insulated with an appropriate insulating material so that furnace 2 maintains the proper temperature. Such insulation may comprise refractory materials which are chemically and physically stable at high temperatures, resistant to thermal shock and are chemically inert. For example, the insulating material may be ceramic fiber. Furnace 2 is provided with door 6 which opens and securely closes to allow for the entry and exit of the material to be treated. Door 6 may be provided with appropriate sealing and closing mechanisms (not shown) to allow for proper heating and cooling of the furnace 2. Furnace 2 may be constructed at any size and dimension, depending on the intended use. As an example, furnace 2 may be of the dimension of 12' long×8' wide×5' high to allow for industrial applications.

Furnace 2 is provided with one or more burners 10. In one embodiment, each burner 10 may be mounted within furnace wall 4; i.e., burner 10 is integrated within wall 4. In an additional embodiment, burner 10 may be supported on wall 4 or the ceiling portion of furnace (not shown) through an appropriate mounting apparatus. Each burner 10 is in flow communication with a fuel source 28 and a source of preheated combustion air 24, as discussed below. Burners 10 may be placed at locations that are convenient as dictated by the size and use of furnace 2. Burners 10 are known in the art, and may comprise for example, a Tempest® burner with refractory burner block and spark initiator. Furnace 2 may be further provided with a safety control system 11 comprising a UV scanner. The safety control system 11 utilizes a UV scanner to detect the presence or absence of a flame in burner 10. Burner 10 may also comprise an ignition source 13, for example an ignition transformer, for ignition.

Referring again to FIG. 1, furnace 2 comprises a plurality of furnace ports 8 which are placed integrally within furnace wall 4. Heated furnace exhaust gases, for example at temperature of 500° F. to 2000° F., exits from these ports and is recycled as detailed below. Furnace 2 is also provided with one or more exhaust flues 12 which are in flow communication with the interior of the furnace and may be utilized to vent hot furnace air into the atmosphere in order to adjust the furnace pressure. Exhaust flue 12 may be placed in a location that allows for the best furnace temperature uniformity.

Regenerative firing system 1 further comprises a plurality of regenerator boxes 14. Each regenerator box 14 is in flow communication with furnace 2. The regenerator boxes 14 may be placed at varying locations around furnace 2 depending on the space requirements of furnace 2. As discussed in detail below, individual regenerator boxes 14 are not dedicated to a single burner 10 and are in flow communication with all burners 10. Therefore it is unnecessary to locate the regenerator box 14 in direct proximity to burner 10.

Figure 2:
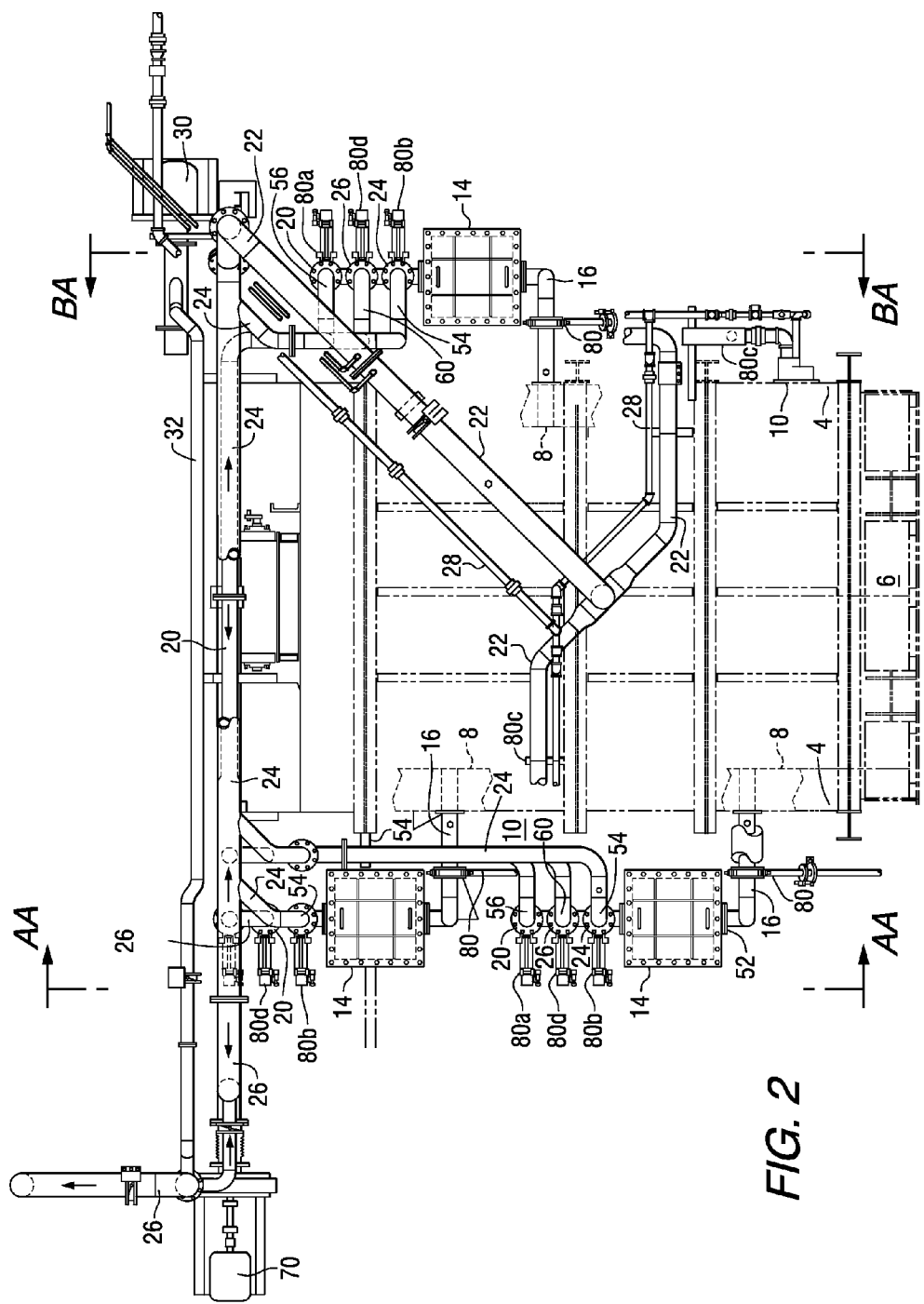
FIG. 2 is an alternative schematic view of the regenerative firing system in accordance with the present invention.
Figure 5A:
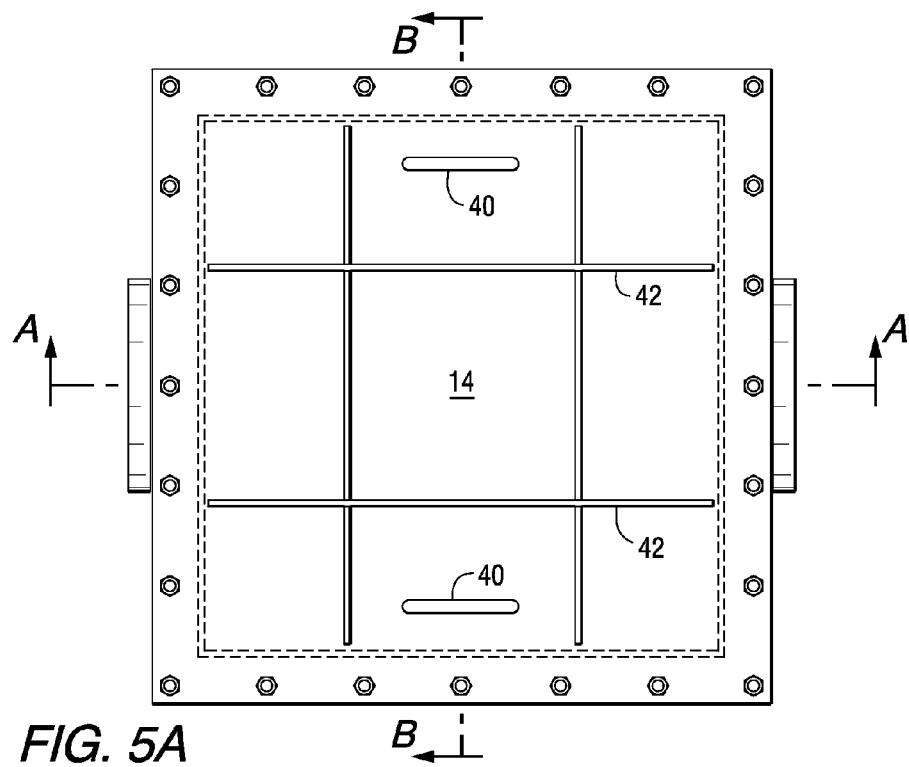
FIG. 5A is a top view of the regenerator box of the invention.

The function and operation of the regenerative firing system 1 of the invention will now be described in detail. Referring now to FIGS. 1 and 2, heated furnace exhaust 16, generally at a temperature of between 500° F. and 2000° F., is expelled from the furnace 2 through furnace port 8. When valve 80 is turned to the open position, heated furnace exhaust 16 flows to regenerator box 14. The regenerator box 14 of the invention is illustrated in greater detail in FIGS. 5A-5D. Referring to FIG. 5A, regenerator box 14 is shown with a generally square configuration. The regenerator box 14 is constructed of a material which is chemically and physically stable at high temperatures. For example, regenerator box 14 may be constructed from an insulating castable material. Metallic or ceramic stiffening bars 42 are provided to add support and handles 40 allow for ease of movement and installation. Regenerator box 14 may be any size appropriate for its intended application. For instance, the regenerator box 14 may be 2'-3' wide and 2'-3' tall.

Figure 5D:
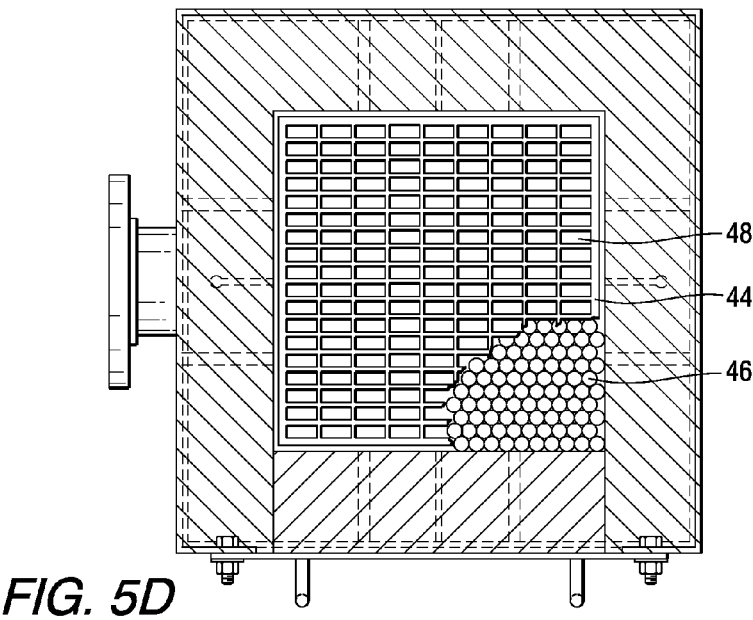
FIG. 5D is a section view of FIG. 5B taken along line C-C.
Figure 5B:
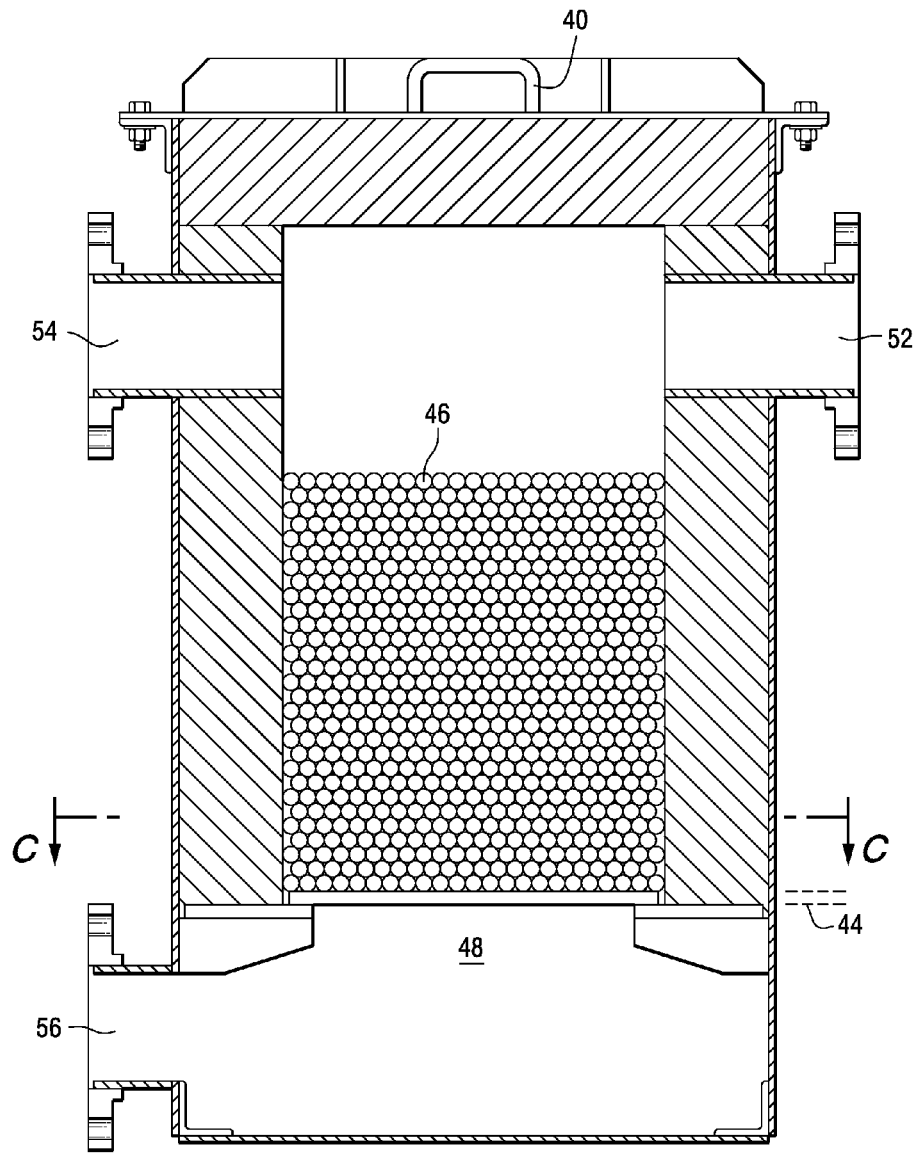
FIG. 5B is a section view of FIG. 5A taken along line A-A.
Figure 5C:
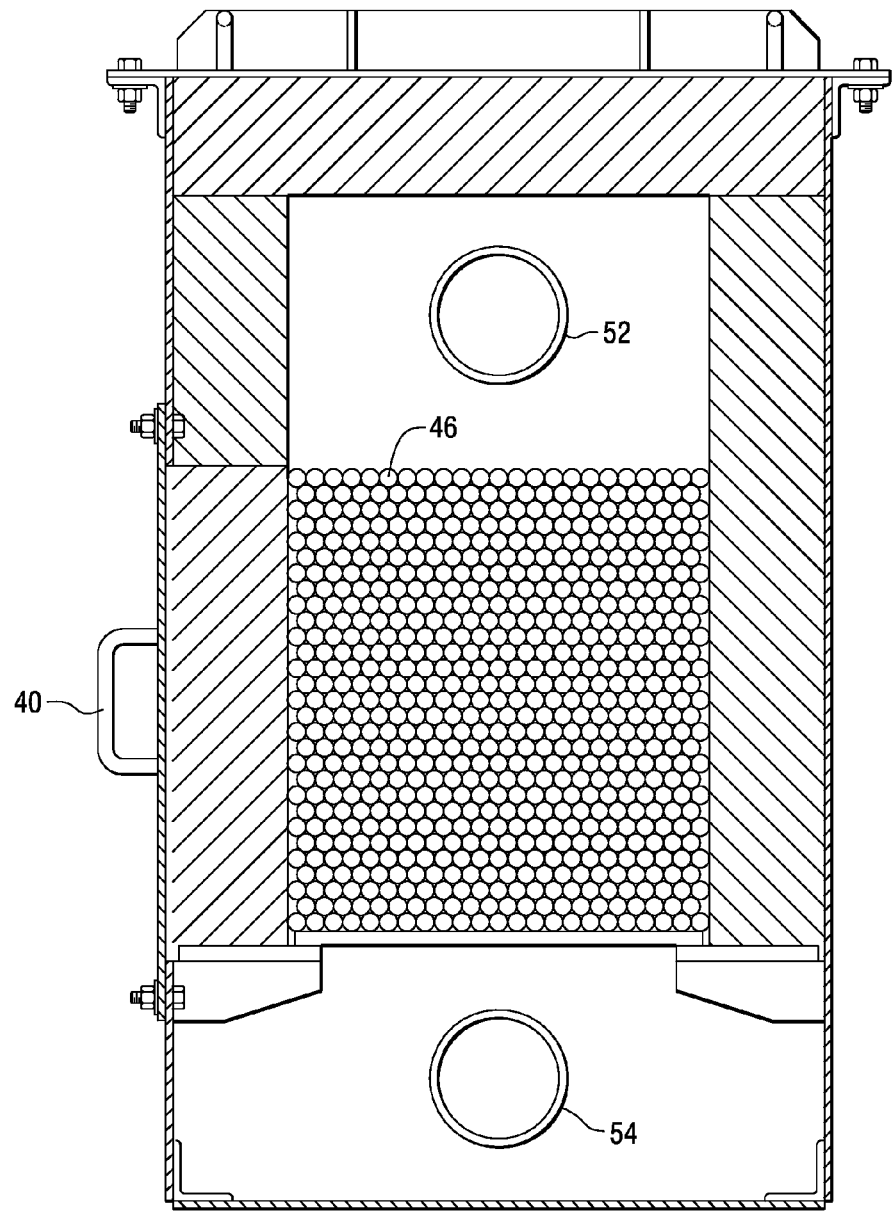
FIG. 5C is a section view of FIG. 5A taken along line B-B.

Referring now to FIGS. 5B and 5C, regenerator box 14 is further provided with a heat absorbing air permeable media 46. Media 46 absorbs heat rapidly from the heated furnace exhaust. In the reverse flow, media 46 rapidly gives up the absorbed heat to the ambient regenerator supply air, described in greater detail below. In one embodiment, media 46 comprises tabular alumina spheres approximately ¾ inch in diameter. It is to be understood that media 46 may comprise any material that is capable of absorbing and transferring heat. Media 46 may be any shape or configuration that is allows air to flow around and through the media. In one embodiment, media 46 is a round or spherical configuration to allow for maximum air flow through regenerator 14. Media 46 is contained within regenerator box 14 through the use of grate 44 (FIG. 5D). Grate 44 may be constructed from the same material as regenerator box 14, or alternatively may comprise a metal. Grate 44 contains a plurality of openings 48 which are smaller than the diameter of media 46. Openings 48 are small enough to prevent media 46 from exiting regenerator box 14 but large enough to allow for adequate air flow around media 46 to promote heat transfer.

Referring again to FIGS. 1 and 2, heated furnace exhaust travels along line 16 from furnace 2 and enters regenerator box 14 through incoming air pipe 52 (FIG. 5B). The flow of heated furnace exhaust along line 16 continues for a period of time until media 46 is heated to an appropriate temperature. The appropriate temperature is specific to the type of media 46 in use and the intended use of the furnace. The flow of heated furnace exhaust along line 16 into regenerator box 14 is then stopped by closing valve 80. It is to be understood that the operation, i.e., opening and closing, of all valves described herein may be accomplished by any appropriate means known in the art. For instance, the operation of valves may be performed manually, or alternatively may be controlled by a computer system. It is also to be understood that the various component parts of system 1 are in flow communication with each other, as is illustrated in detail in the accompanying figures. For example, furnace 1 is in flow communication with regenerator box 14, while all burners 10 are in flow communication with each regenerator box 14. The movement of air throughout the present system is accomplished with the use of pipes or other instruments as will be known to one of skill in the art.

The cold ambient regenerator air supply enters the regenerative firing system 1 from outside the furnace 2 through combustion air inlet 86. The cold regenerator air supply travels along line 20 and is in flow communication with regenerator box 14. The cold regenerator air supply flows along line 20 through the system 1 by the use of combustion air fan 88, which is also in flow communication with the regenerator boxes 14. After the regenerator 14 reaches a preset temperature, the flow of heated furnace exhaust into regenerator box 14 is stopped by closing valve 80. Valves 80*a* are then opened and cold regenerator air supply then enters regenerator box 14 through air supply/discharge pipe 56 (FIG. 5B). The heat from media 46 within regenerator box 14 is transferred to the cold regenerator air, resulting in the production of hot regenerator air. Valve 80*b* is then closed, ceasing the stream of cold regenerator supply air into regenerator box 14. The hot regenerator air is streamed along line 24 from regenerator box 14 through hot discharge pipe 54 (FIG. 5B).

Figure 3:
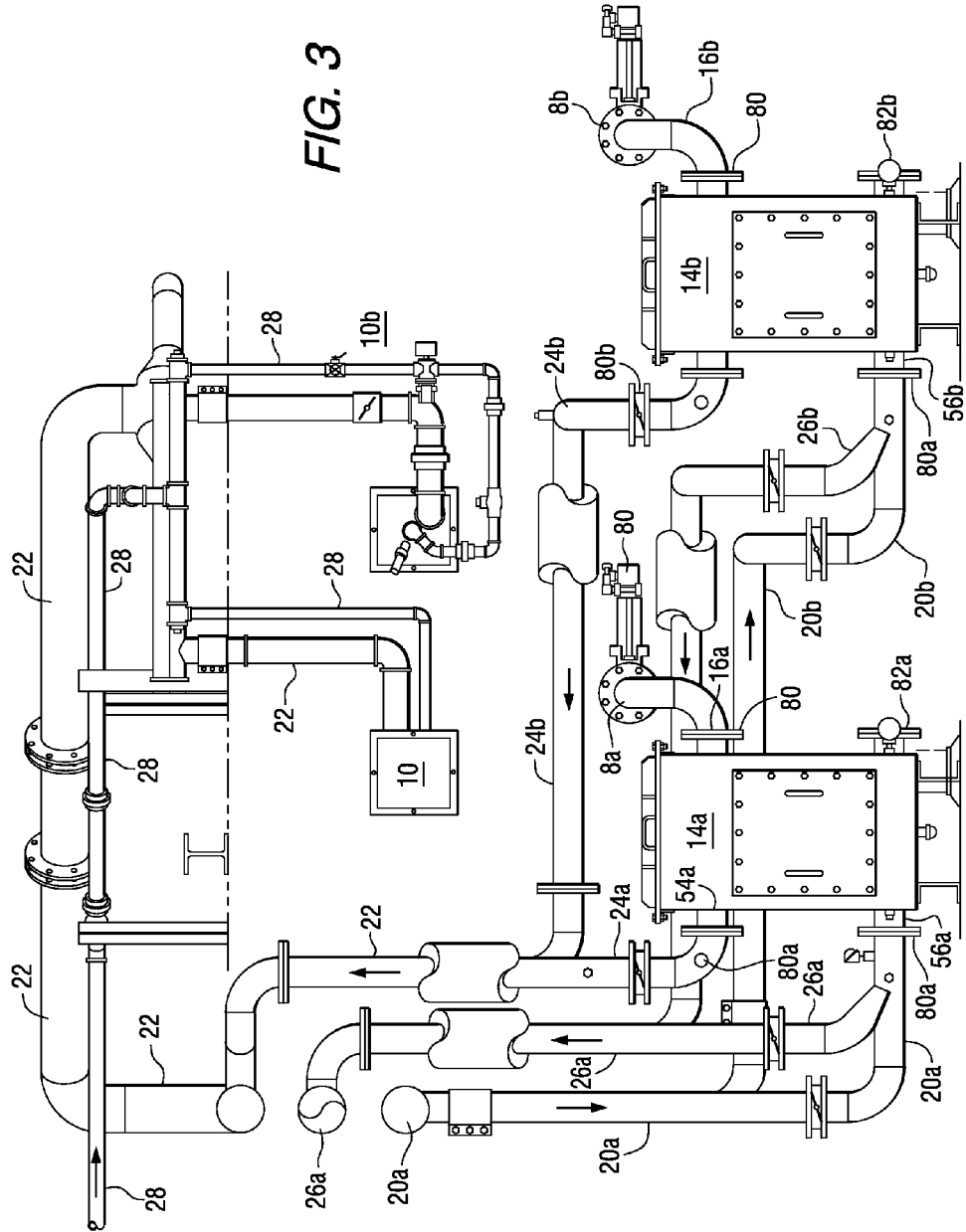
FIG. 3 is a section view of FIG. 2 taken along line AA-AA.

It is contemplated that the regenerative firing system 1 of the present invention comprises a plurality of regenerator boxes 14 in its operation. In a preferred embodiment, the present regenerative firing system 1 employs two or more regenerator boxes 14 each of which is in flow communication with and supplies preheated air to each of multiple burners 10. Referring now to FIG. 3, two regenerator boxes 14*a* and 14*b* are illustrated. Each box is in flow communication with a furnace port 8. Valves 80 are opened and each regenerator receives heated furnace air along lines 16*a* or 16*b* (respectively) through air supply/discharge pipes 56*a* or 56*b*. The media 46 (not shown) contained in regenerator boxes 14*a* and 14*b* absorbs the heat from the heated furnace air. The flow of heated furnace exhaust along lines 16*a* or 16*b* into regenerator boxes 14*a* and 14*b* continues for a specified period of time as is appropriate for the particular application and the types of regenerators and burners in use. The flow of heated furnace exhaust is then stopped by closing valves 80. Valves 80*a* are opened and cold regenerator air supply travels along lines 20*a* and 20*b* and enters the regenerator boxes 14*a* and 14*b* through air supply/discharge pipes 56*a* and 56*b*. The cold regenerator air supply receives heat from media 46 (not shown), resulting in the production of hot regenerator air discharge. Valves 80*a* are then closed at an appropriate time, ceasing the stream of cold regenerator supply air along lines 20*a* and 20*b* into regenerators 14*a* and 14*b*. Valves 80*b* are then opened. The hot regenerator air discharge travels along lines 24*a* and 24*b* and flows into a common hot regenerator air discharge stream, referred to here as a combustion air stream. The combustion air stream flows along line 22. Oxygen sensor 58 may be utilized to monitor the concentration of oxygen in the combustion air stream 22. The oxygen concentration of the combustion air may be adjusted by the addition of recirculated exhaust gases from the exhaust fan 30 along line 72 directly back into line 22 into the heated combustion air stream. The addition of recirculated exhaust gases into the heated combustion air stream assists in the reduction of certain emissions in the flue gases, for example Sox and NOx, and may be controlled with the use of a valve in line 32 (FIG. 2). Valve 80*c* (FIGS. 1 and 2) is opened and the heated combustion air is then directed via line 22 to each of the plurality of burners 10. Burners 10 receive a flow of fuel supply along line 28 which combines with the heated combustion air to allow for the ignition of the burners. It will be appreciated from the above description that each regenerator box 14 provides heated regenerator air along line 24 to all of the burners 10 in regenerative firing system 1. Each regenerator box 10 supplies heated regenerator air along line 24 to a common combustion air supply, which is subsequently directed to each burner 10. Although the above discussion contemplates the use of three regenerator boxes 14, it will be appreciated by one of skill in the art that any number of such boxes may be utilized in system 1. For instance, two regenerator boxes 14 may provide heated regenerator air 24 to common combustion air supply 22. The number of regenerator boxes 14 will vary depending on the intended use of the furnace and the number and type of burners 10 in use.

Each regenerator box 14 further comprises a temperature thermocouple 82 which provides an individual temperature control loop for regenerator box 14. The temperature loop manages, commands, directs and regulates the flow of air into and out of regenerator box 14. The temperature of the heated air produced by the regenerator box 14 is constantly monitored and adjusted to maintain a temperature according to user-defined settings. Thermocouple 82 operates as a feedback control. When the temperature of the heated regenerator air discharge falls below a set point, the stream of heated furnace exhaust is directed to media 16 within regenerator 14 for a longer period of time. Likewise, when the temperature of the heated regenerator air discharge exceeds a certain level, the stream of heated furnace exhaust is directed to media within regenerator 14 for a shorter period of time, or may be discontinued. The control loop varies the amount or temperature of heated furnace exhaust entering the regenerator box 14 so that various components of the system are not damaged by excessive heat.

In a preferred embodiment, the regenerative firing system 1 of the invention utilizes at least two regenerator boxes 14. The regenerator boxes 14 work in sequential order. As described in detail above, each regenerator box 14 cycles through a process of: (1) opening a set of valves 80 and providing heated furnace exhaust to a media 46; (2) transferring heat from the furnace exhaust to the media 46; (3) discontinuing the supply of heated furnace exhaust to the matrix by closing valves 80; (4) simultaneously opening valves 80*a* and providing a cold regenerator air supply to the media 46; (5) discontinuing the supply of cold regenerator air by closing valves 80*a*; (6) transferring heat from the media 46 to the cold regenerator air supply; and (7) opening valves 80*b* and expelling the now heated regenerator air discharge to a common combustion air stream. The present system 1 is configured so that each regenerator box 14 is simultaneously performing a different step in this cycle. For example, while a first regenerator box 14 is supplying heated regenerator air discharge to the common combustion stream, a second regenerator 14 is simultaneously receiving heated furnace exhaust. Additional regenerator boxes 14 may be added to the system as dictated by the temperature requirements of the particular application. However, each regenerator box 14 is configured to operate at a different part of the heating and exhaust cycle. This type of overlapping cycling ensures that there is a continuous supply of heated regenerator air discharge to the common combustion air stream and thus a continuous supply of heated combustion air to all burners 10. None of the regenerator boxes 14 are dedicated to a single individual burner 10. Instead, regenerator boxes 10 collectively supply a stream of heated regenerator air discharge to a common combustion air supply, which simultaneously feeds each burner 10. Unlike prior art burners, it is therefore unnecessary for the present burners 10 to cycle on and off due to a cessation of the combustion air supply from a single dedicated regenerator 14. Thus, the burners 10 of the present system may constantly fire with a proportional modulation control system. There is no need to provide a large number of redundant burners in an attempt to compensate for the lack of constantly firing burners. The present system therefore allows for enhanced furnace temperature uniformity and a savings in fuel cost due to the efficiency of the regenerator boxes 14.

The plurality of regenerators 10 will cycle through the steps of opening valves 80 and accepting heated furnace exhaust, transferring heat to a matrix, closing valves 80, opening valves 80*a* and heating cold regenerator air supply, closing valves 80*a*, and opening valve 80, supplying heated regenerator air discharge to the common combustion air stream, and providing heated combustion air to each individual burner 10 until the burners 10 have heated to a maximum operating temperature. This maximum temperature is specific to and will vary with the type of burner employed. For example, exceeding temperatures of 1000° F. may damage the components of burner 10. Each burner 10 further comprises temperature thermostat 82 (not shown) which provides an individual temperature control loop for the burner 10. Similar to the temperature control loop 82 for regenerator box 14, this control loop regulates the temperature of the regenerator air discharged entering burner 10. The temperature of the heated air entering burner 10 is constantly monitored and adjusted to maintain a temperature that will not damage the burner 10. As described previously, thermocouple 82 operates as a feedback control. When the temperature of the heated regenerator air discharge exceeds a certain set point, the stream of heated furnace exhaust is directed to media 16 within regenerator 14 for a shorter period of time, or may be discontinued. The control loop varies the amount or temperature of heated furnace exhaust entering the regenerator box 14 so that various components of the system are not damaged by excessive heat.

Figure 4:
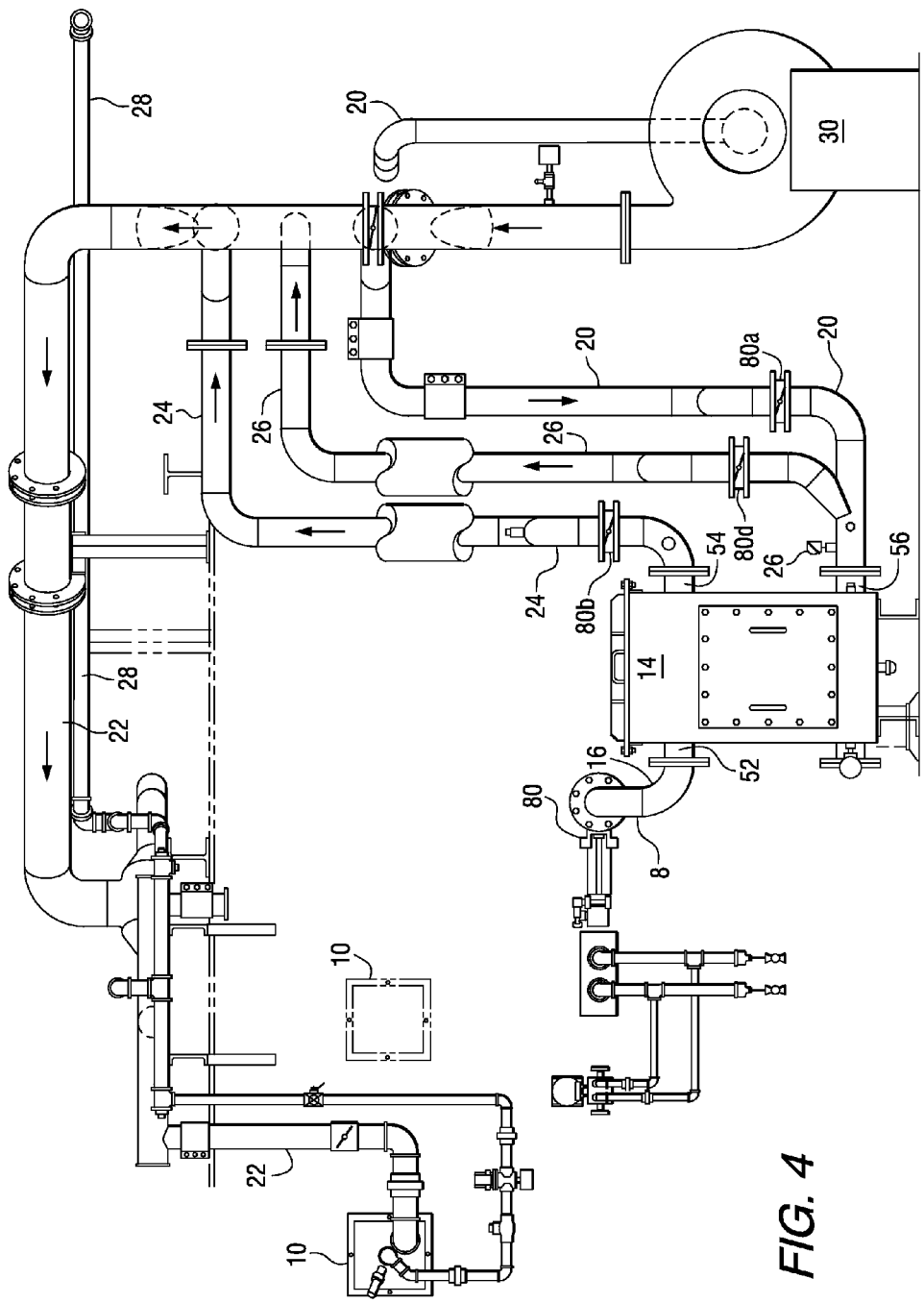
FIG. 4 is a section view of FIG. 2 taken along line BA-BA.

FIG. 4 illustrates the temperature loop control system described above. Here, the direction of the flow of heated regenerator air discharge is used to regulate the temperature of burners 10. As illustrated in FIG. 4, the amount of cold regenerator air supply moving along line 20 into regenerator 14 is halted by closing valves 80*a*. In addition, valves 80*a* are closed while valve 80*d* is opened. As a result, the flow of heated regenerator air discharge along line 24 is no longer directed to a common combustion air stream. Instead, the opening of butterfly valve 80*d* allows the heated regenerator air discharge to flow out of regenerator box 14 via air supply/discharge pipe 56. The heated regenerator air discharge, now referred to as regenerator exhaust, is directed along line 26 and away from burners 10. The regenerator exhaust is moved along line 26 through and out exhaust flue 12 (not shown) and into the atmosphere through the use of regenerator box exhaust fan 70. Regenerator box exhaust fan 70 is in flow communication with regenerator 14. The regenerator exhaust may undergo additional treatments before discharge into the atmosphere to lessen adverse environmental impacts, for example exhaust gas recirculation for NOx reduction (not shown).

As is clear from the above discussion and the accompanying figures, regenerator boxes 14 are not directly connected to a single burner 10. As a result, it is not necessary to place regenerator boxes 14 in direct proximity to burners 10. It is instead possible to place regenerator boxes 14 at any position around furnace 2 that is convenient. Movement of the heated regenerator air discharge from each regenerator box 10 may be easily directed to the common combustion air stream through the use of pipes or other mechanisms known in the art. This creates flexibility in space utilization and allows for advantageous furnace exhaust flue 12 location. In addition, firing system 1 may be adapted to a previously installed conventional furnace system because use of the present regenerator boxes 14 does not require significant structural changes or modifications to the existing furnace.

Finally, one preferred embodiment of the invention has been described hereinabove and those of ordinary skill in the art will recognize that this embodiment may be modified and altered without departing from the central spirit and scope of the invention. Thus, the embodiment described hereinabove is to be considered in all respects as illustrative and not restrictive. The scope of the invention being indicated by the appended claims rather than the foregoing descriptions and all changes which come within the meaning and range of equivalency of the claims are intended to be embraced herein.

What is claimed is:

1. A regenerative firing system for a furnace, comprising:
    a furnace, wherein the furnace creates heated furnace exhaust gas;
    two or more burners;
    two or more regenerators in flow communication with said furnace;
    a first valve, wherein the first valve opens and closes to control the flow of the heated furnace exhaust gas to a first regenerator of the two or more regenerators;
    a second valve, wherein the second valve opens and closes to control the flow of the heated furnace exhaust gas to a second regenerator of the two or more regenerators;
    wherein the first valve is independent from the second valve such that opening and closing of the first valve does not control the flow of the heated furnace exhaust gas to the second regenerator;
    wherein said two or more regenerators are each in flow communication with each of said two or more burners, wherein pre-heated combustion air exiting from a first one of said two or more regenerators merges with pre-heated combustion air exiting from a second one of said two or more regenerators to form a combined pre-heated combustion air stream, and wherein the combined pre-heated combustion air stream flows into each of said two or more burners.

2. The regenerative firing system of claim 1, wherein said two or more regenerators further comprises a media.

3. The regenerative firing system of claim 1, further comprising:
    an inlet for the heated furnace exhaust gases;
    an inlet for ambient air;
    an outlet for heated regenerator exhaust; and
    valves for controlling air and exhaust flow through said inlet for ambient air and said outlets.

4. The regenerative firing system of claim 1, wherein said furnace is a fuel fired heating furnace.

5. The regenerative firing system of claim 1, wherein said two or more regenerators are three regenerators in number.

6. The regenerative firing system of claim 2, wherein said media comprises alumina spheres.

7. The regenerative firing system of claim 1, wherein said furnace combustion air is at temperature of between 100° C. and 1100 C.

8. The regenerative firing system of claim 3, wherein said inlet for ambient air and said outlet for regenerator exhaust comprise the same outlet.

9. A method of heat recovery for a furnace comprising:
    (1) directing a flow of heated furnace exhaust from a furnace to two or more regenerators;
    (2) directing said heated furnace exhaust through a media within each of said two or more regenerators for a specified period of time;
    (3) discontinuing said flow of heated furnace exhaust into said two or more regenerators;
    (4) directing a flow of ambient air through said media within each of said two or more regenerators to produce heated regenerator air;
    (5) discontinuing said flow of ambient air through each of said two or more regenerators;
    (6) directing a flow of heated regenerator air from each of said two or more regenerators to a common combustion air stream flow such that pre-heated combustion air exiting from a first one of said two or more regenerators merges with pre-heated combustion air exiting from a second one of said two or more regenerators to form the common combustion air stream flow;
    (7) directing said common combustion air stream flow to each of two or more burners located on said furnace;
    (8) repeating steps (1) thru (7) until said two or more burners have reached a maximum allowable temperature;
    wherein said two or more regenerators are each in flow communication with each of said two or more burners, and wherein none of the two or more regenerators is simultaneously performing any of steps (1) thru (7), and
    (9) providing a first valve and a second valve, wherein the first valve opens and closes to control the flow of the heated furnace exhaust to a first regenerator of the two or more regenerators, wherein the second valve opens and closes to control the flow of the heated furnace exhaust to a second regenerator of the two or more regenerators, and wherein the first valve is independent from the second valve such that opening and closing of the first valve does not control the flow of the heated furnace exhaust to the second regenerator.

10. The method of claim 9, further comprising repeating steps (1) thru (7) wherein step (2) comprises directing said heated furnace exhaust through a media within each of said two or more regenerators for a period of time that is less than said specified period of time.

11. The method of claim 9, further comprising directing the flow of said heated furnace exhaust to a furnace exhaust outlet.

12. The method of claim 9, wherein said furnace is a fuel fired heating furnace.

13. The method of claim 9, further comprising at least two regenerators in flow communication with said furnace.

14. The method of claim 9, wherein said media comprises alumina spheres.

15. The method of claim 9, wherein heated furnace combustion air is at temperature of between 100° C. and 1100° C.

16. The method of claim 9, wherein the maximum allowable temperature is approximately 1000° F.

* * * * *

UNITED STATES PATENT AND TRADEMARK OFFICE
CERTIFICATE OF CORRECTION

PATENT NO. : 8,740,612 B2
APPLICATION NO. : 12/827102
DATED : June 3, 2014
INVENTOR(S) : Bryan Joseph Kraus It is certified that error appears in the above-identified patent and that said Letters Patent is hereby corrected as shown below:

In the Claims

At column 10, line 5 of the issued patent the word "said" should be deleted.

Signed and Sealed this
Fourteenth Day of October, 2014

Michelle K. Lee
*Deputy Director of the United States Patent and Trademark Office*